June 7, 1960  E. FEICHT  2,939,433
VALVE ARRANGEMENT FOR A FLUID MOTOR
Filed March 26, 1956  4 Sheets-Sheet 1

FIG. I

INVENTOR
EARL FEICHT

BY John C Black
ATTORNEY

June 7, 1960

E. FEICHT 2,939,433

VALVE ARRANGEMENT FOR A FLUID MOTOR

Filed March 26, 1956

INVENTOR
EARL FEICHT

BY John C. Black
ATTORNEY

June 7, 1960 E. FEICHT 2,939,433
VALVE ARRANGEMENT FOR A FLUID MOTOR
Filed March 26, 1956 4 Sheets-Sheet 3

INVENTOR
EARL FEICHT

BY John C. Black
ATTORNEY

June 7, 1960  E. FEICHT  2,939,433
VALVE ARRANGEMENT FOR A FLUID MOTOR
Filed March 26, 1956  4 Sheets-Sheet 4

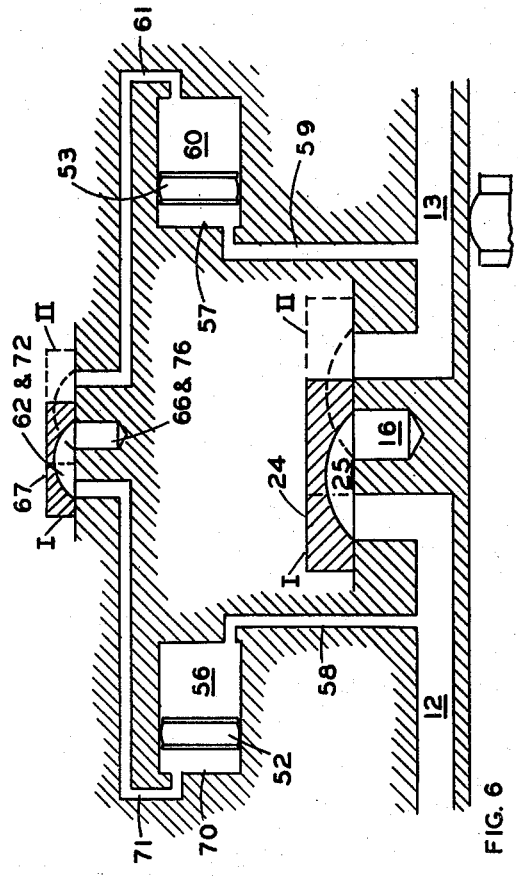

FIG. 6

| CYCLE OF OPERATION | VALVE 67 | VALVE 24 | CHAMBER 70 | CHAMBER 56 | CHAMBER 57 | CHAMBER 60 | RESULTANT PRESSURE |
|---|---|---|---|---|---|---|---|
| AS SHOWN FIG. 2 | I | I | A* | A | P | P | SUBSTANTIALLY BALANCED |
| PILOT SHIFTS | II | I | P* | A | P | A | 2 P |
| MAIN VALVE SHIFTS | II | II | P | P | A | A | SUBSTANTIALLY BALANCED |
| PILOT SHIFTS | I | II | A | P | A | P | 2 P |

* A — ATMOSPHERIC PRESSURE
P — OPERATING FLUID PRESSURE

FIG. 7

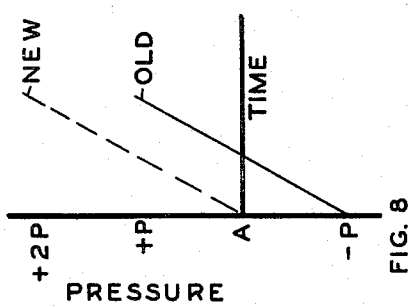

FIG. 8

INVENTOR
EARL FEICHT

BY John C Black
ATTORNEY

United States Patent Office 2,939,433
Patented June 7, 1960

2,939,433

VALVE ARRANGEMENT FOR A FLUID MOTOR

Earl Feicht, Chicago, Ill., assignor to Stewart-Warner Corporation, Chicago, Ill., a corporation of Virginia Filed Mar. 26, 1956, Ser. No. 573,733

9 Claims. (Cl. 121—158)

This invention relates in general to fluid motors, and, more particularly, to a valve and valve shifting arrangement for use therewith.

Reciprocating fluid motors commonly utilize the well-known D-valve arrangement in which a valve reciprocally slides on a seat having two ports in communication with opposite ends of a cylinder in which a motor piston is disposed, and having a venting port centrally located between the first ports to alternately pressurize each side of the cylinder while venting the other side. Trouble is often encountered with regard to the sliding valve sticking at the dead-center position when the motor is started, stopped or operated at unusually slow speeds, for example, to operate a pump which continuously maintains a predetermined pressure in a lubrication system. In the dead-center position, the pressure on either side of the piston is equalized, and the motor becomes inoperative. Consequently, means are provided for preventing the valve from stopping at dead-center, such means usually being a type of snap-action toggle switch or cam arrangement.

However, all such toggle and cam arrangements, known to the inventor, result in applying extreme shock forces to the valve and its actuating mechanism, resulting in excessive vibration and wear on the parts. This is tolerable in small and/or slow fluid motors where the mass of the valve and actuating mechanism is relatively small; however, if a high power fluid motor is desired, for example, to operate a high capacity fluid transfer pump, the size of the valve and its actuating mechanism becomes excessive, and the wear upon parts becomes intolerable. It is apparent that the power output of a fluid motor may be increased by increasing the effective piston area, or by increasing the speed. In either event, larger ports, and, therefore, larger valves and toggles, are required. From a cost and space consideration, it is advantageous to increase the speed within limits, rather than the piston area. But increase in speed also causes undue wear on snap-action moving parts.

Many attempts have been made to devise a pilot-operated system whereby an auxiliary pilot valve controlled by the fluid motor piston is utilized to control a fluid actuator for the primary D-valve of the motor. However, this scheme proved unsatisfactory because the pilot valve system proved to be too sluggish and slow, whereby it did not operate properly at high speeds.

Other modified pilot arrangements utilized a combination of a mechanical valve shifting means with a pilot valve controlled fluid actuator. However, in these modified arrangements, the efficiency of the fluid motor is substantially reduced because the mechanical shifting means must overcome an opposing pilot force. In other air motors in use today, considerable power is lost in overcoming various valve actuating mechanisms.

The inventor herein proposes to utilize a pilot valve which is effective at lower speeds to cause the main valve to shift with a snap-action across the dead-center position, and to utilize a rocker arm shifting means controlled by the main piston to override the pilot valve at higher speeds, but without any appreciable loss of power in the motor.

At lower speeds the main piston shaft operates an actuating mechanism to initiate the movement of the pilot valve, and the pilot then takes over to cause the main valve to shift with a snap-action. When the speed of the main piston becomes sufficiently high, the actuating mechanism shifts the main valve at its speed (or greater, due to the aid of the pilot means), thereby to override the pilot valve. By means of a unique arrangement the pilot valve controlled fluid actuator exerts at most only a nominal force against the mechanical actuator during its initial movement by the power piston whereby the fluid actuator can be made as large as is necessary to give a desirable snap-action without undue loss of power.

At both high and low speeds a small but effective air pressure cushioning aids in reducing wear on the fluid actuator when it strikes the housing at either end of its stroke.

Accordingly, it is the primary object of the present invention to provide an improved valve actuating arrangement for reciprocating fluid motors.

Another primary object of the present invention is the provision of an improved valve actuating arrangement especially advantageous for use in high power and/or high speed fluid motors.

A feature of the present invention is the provision in a fluid motor of an improved valve shifting arrangement controlled by mechanical means directly and by a pilot valve controlled means, either of which can predominantly override the action of the other, depending upon the high or low speed operation of the fluid motor.

Another feature is the provision of an arrangement of the type described in the next preceding paragraph, which causes little or no power loss.

Another feature is the provision of an arrangement of the type described above which has a means to absorb part of the impact of the valve shifting means to reduce wear.

Another feature is the provision of a mechanical actuator and pilot controlled fluid actuator for the main valve of a reciprocating fluid motor in which the fluid actuator exerts little or no force in opposition to the mechanical actuator, whereby the fluid actuator can be designed to provide as much force as is necessary to cause a desired snap-action shifting of the main valve.

Other objects and features will be evident upon a perusal of the following description in which:

Fig. 6 is a schematic representation of the valve arrangement;

Fig. 7 is a chart showing operating conditions of the fluid actuator in various positions of the valves; and Fig. 8 is a pressure time curve illustrating certain features of the present invention.

Figure 1:
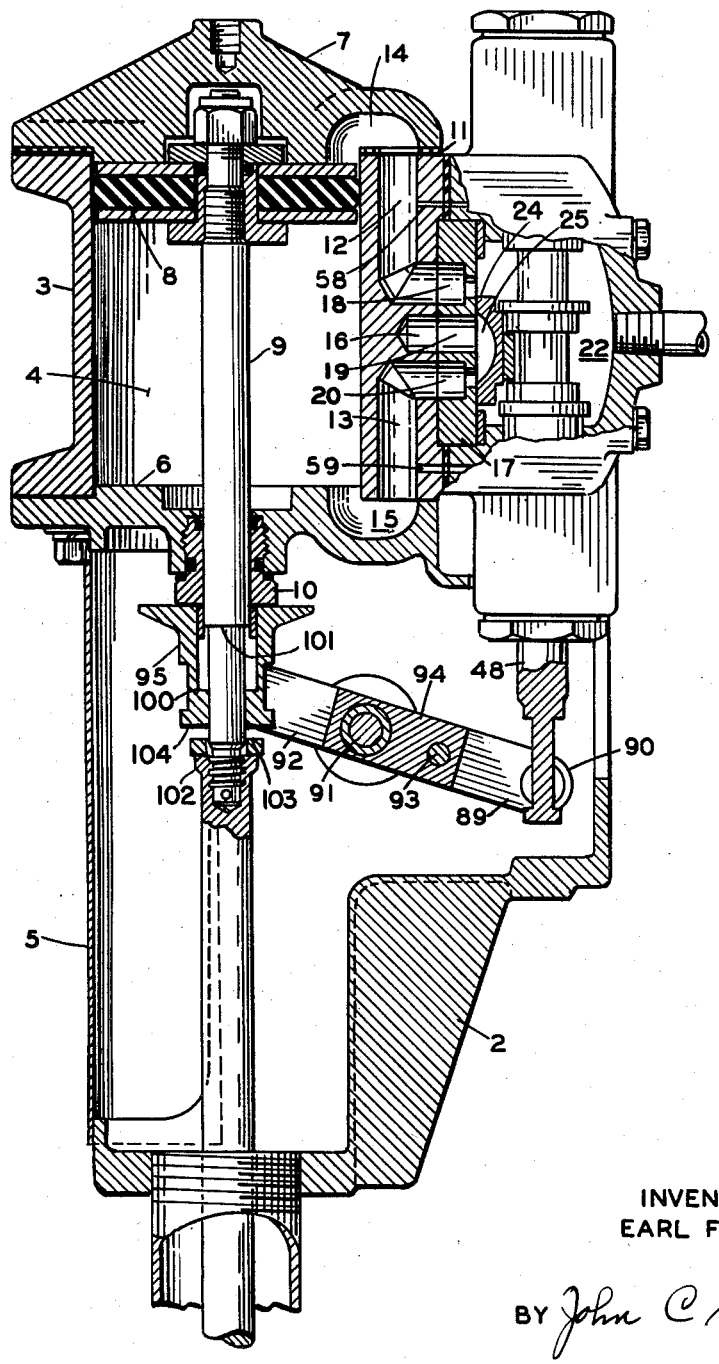
Fig. 1 is an elevation view, partially in section, of the air motor.

The reciprocating fluid-actuated motor 1 comprises a hollow casing 2 having at one side thereof a removable metal sheet 5. A cylinder section 3 defining a cylinder chamber 4 is bolted to the top of casing 2, which casing forms a lower head 6 for the cylinder. An upper cylinder head 7 is suitably secured to the upper end of cylinder section 3. A power piston 8 of conventional design is reciprocably mounted within the cylinder 4 and secured to a piston rod 9, which rod extends downwardly into the casing 2 through a packing gland and bearing sleeve 10 in the lower cylinder head 6. Cylinder section 3 has a longitudinal boss 11 on one side thereof, drilled to provide passageways 12 and 13 extending from the medial portion of the boss 11 to recesses 14 and 15, formed respectively in upper and lower cylinder heads 7 and 6, and communicating with opposite ends of cylinder 4. An L-shaped vent passageway 16 (partially shown in Fig. 1) is disposed intermediate the two passageways 12 and 13 and communicates with the atmosphere. A main valve seat 17 is disposed adjacent the horizontally disposed portions of passageways 12, 13 and 16, said seat 17 being provided with counterbored passageways 18, 19 and 20 respectively in communication with passageways 12, 16 and 13.

Figure 3:
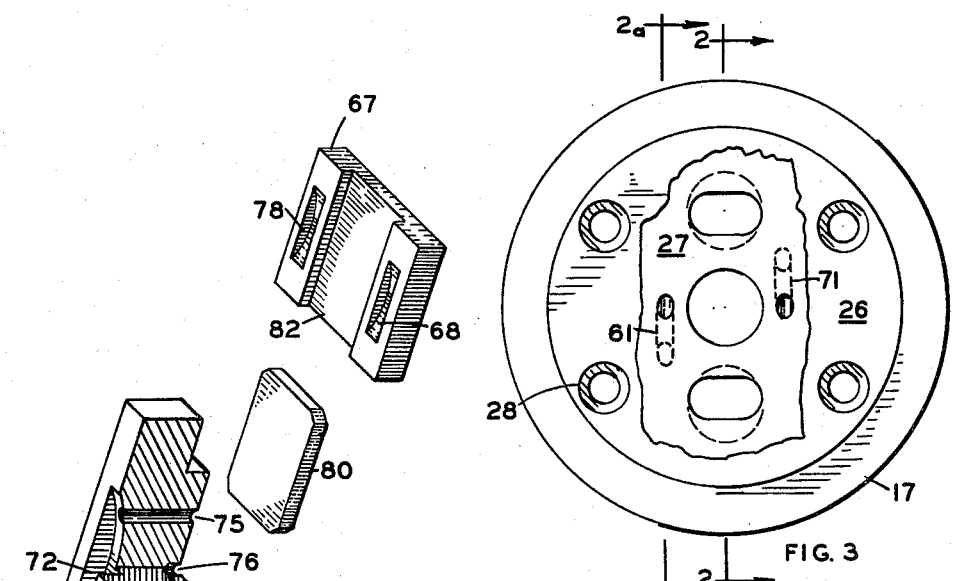
Fig. 3 is a plan view of a main valve seat and a portion of a main valve guide plate.

A guide plate 26 having a generally rectangular opening 27 (Fig. 3) therein is disposed adjacent to valve seat 17 and is secured to cylinder section 3 by means of bolts (not shown) which extend through valve seat 17. Four tubular spacers 28 extend through valve seat 17 and abut against the adjacent surfaces of cylinder section 3 and guide plate 26 to prevent warping of the lapped surface of seat 17 which would otherwise be caused if plate 26 pressed tightly against the surface of seat 17.

A generally cylindrical valve casing 21 (Fig. 3) having a substantially square boss 29 along one side thereof intermediate the ends is suitably bolted to cylinder section 3. Suitable gaskets are placed between cylinder section 3 and valve seat 17 and between cylinder section 3 and boss 29. The valve casing 21, valve seat 17 and spacer 26 (and other elements to be described below) provide a fluid chamber 22 to which fluid under pressure is admitted through inlet 23.

A generally rectangular D slide valve 24 (Fig. 1) is disposed in the opening 27 provided by guide plate 26 and is held against valve seat 17 by the fluid pressure in chamber 22, said slide valve 24 being disposed for reciprocable sliding movement across the face of valve seat 17 for admitting fluid under pressure alternately to each end of cylinder 4 by alternately exposing passageways 18 and 20 to the high pressure fluid chamber 22 while venting the other side of cylinder 4 by means of an arcuate recess 25 alternately connecting the said passageways 18 and 20 to the vent passageway 19.

Either end of valve casing 21 has threaded therein packing nuts 30 and 31 having O sealing rings 32 and 33 disposed therearound. Bushings 34 and 35 are pressed into the cylindrical valve casing 21 intermediate the ends thereof to help form the pressure chamber 22. Gaskets 36 and 37 and V packings 38 and 39 provide a seal for chamber 22. Washers 40 and 41 and liners 42 and 43 are held tightly between their corresponding packing nuts and bushings.

Axially disposed within casing 21 is a valve actuating rod 44 carrying spacers 45, 46, 47 and 48 as well as a shuttle 49. The lower end of actuating rod 44 is screwed into the lower spacer 48. A pin 50 is inserted radially through rod 44 and spacer 48 to further hold them securely together. A nut 51 is screwed on the upper end of rod 44 to firmly hold the spacers 45, 46 and 47 as well as shuttle 49 firmly on rod 44.

Liners 42 and 43 define cylinder chambers adapted to receive auxiliary pistons 52 and 53, which pistons are firmly held between spacers 45 and 46 and 47 and 48 respectively. The outside diameters of spacers 46 and 47 are slightly larger than the outside diameters of spacers 45 and 48 to provide a greater effective area on the outer surfaces of pistons 52 and 53 than on the inner surfaces for reasons to be described below. O rings 54 and 55 provide further sealing for fluid pressure chamber 22.

Cylinder chambers 56 and 57 are connected respectively to passageways 12 and 13 respectively by means of identically similar symmetrically disposed passageways 58 (Figs. 1 and 2) and 59 (shown partially in Fig. 1). It is apparent that chambers 56 and 57 are at all times under the same condition of pressure or venting as their respective passageways 12 and 13.

Figure 2:
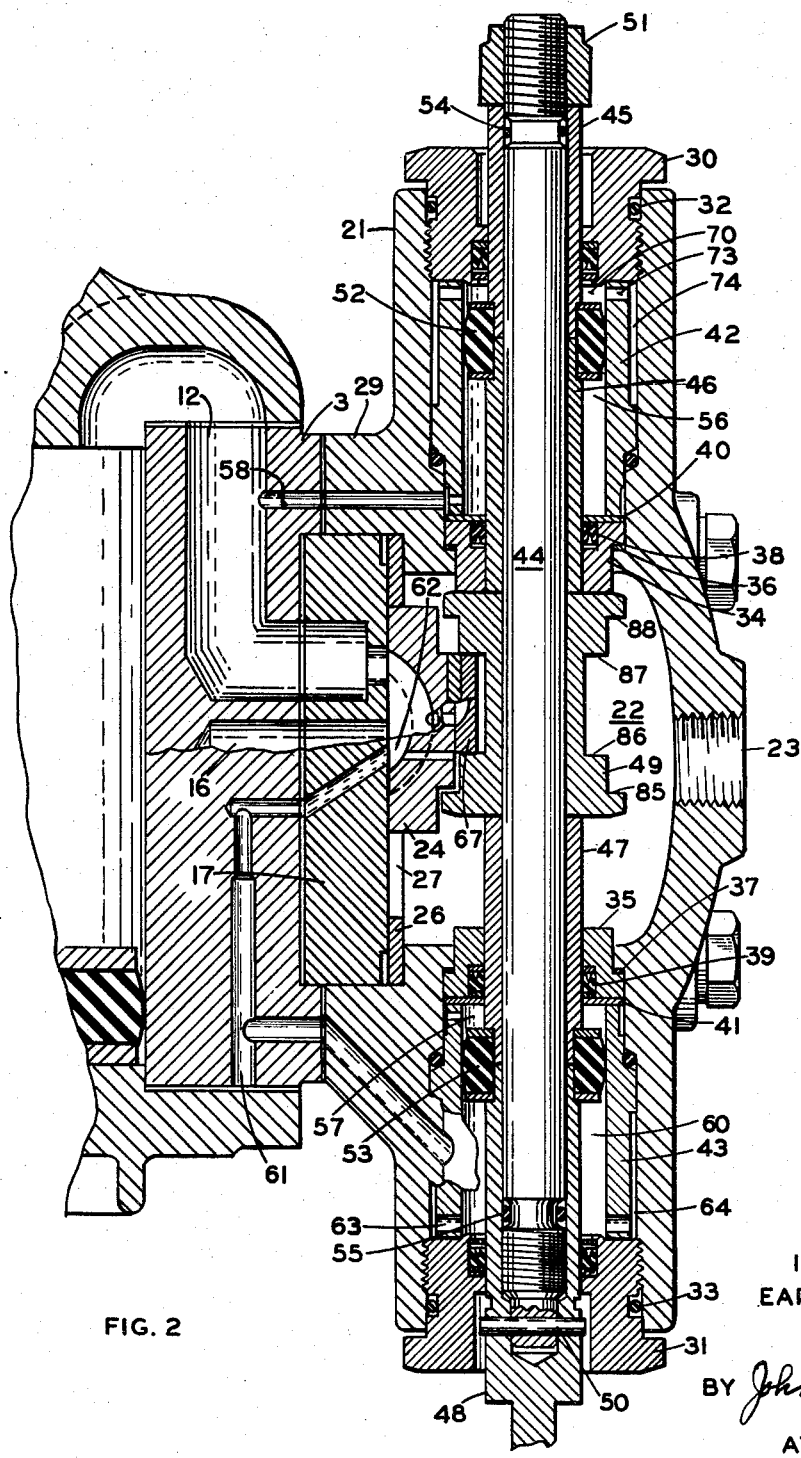
Fig. 2 is a sectional view, generally along line 2—2 of Fig. 3, and partially along line 2a—2a of Fig. 3 to show certain passageways.
Figure 4:
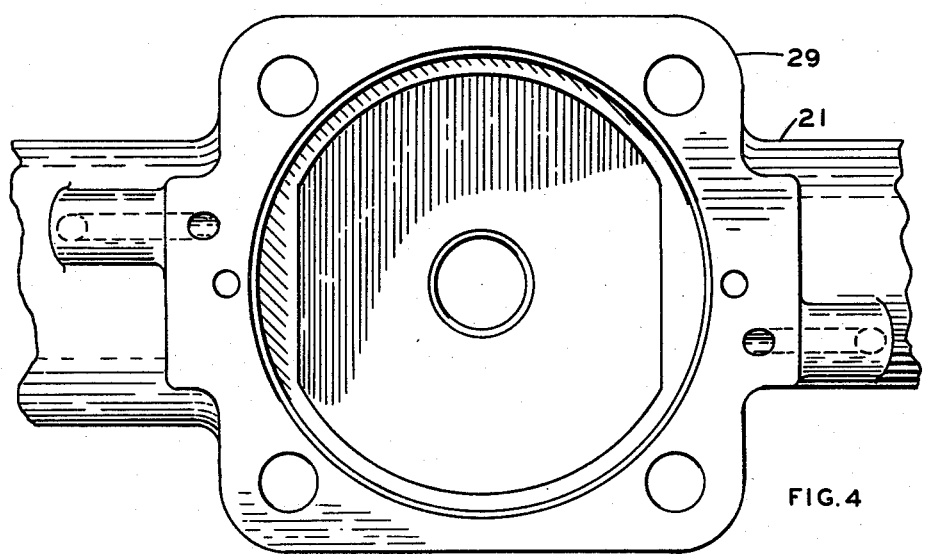
Fig. 4 is a plan view of a portion of a valve casing.
Figure 5:
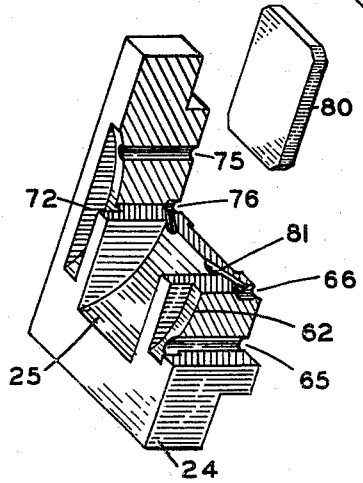
Fig. 5 is an exploded view, partially in section, of the main valve, a pilot valve and a key used therebetween.

As shown in Fig. 2, cylinder chamber 60 is connected at all times through drilled ports 63, annular chamber 64 and passageway 61 to an arcuate recess 62 in the main valve 24, which recess 62 communicates with passageway 61 at all times. The detailed structure of main valve 24 (as best shown in Fig. 5) will now be described. As described above, the large centrally disposed arcuate recess 25 is utilized to connect passageways 12 and 13 alternately to the vent passageway 19, recess 25 at all times being vented. On one side of recess 25 is located a smaller recess 62 which is at all times connected to cylinder chamber 60 as described immediately above. A bore 65 extends from recess 62 to the opposite side of valve 24, which opposite side provides a seat for a pilot valve 67. A second bore 66 extends from the central recess 25 to said opposite side of valve 24 at a point adjacent to bore 65. The pilot valve 67, adapted to be reciprocably moved by shuttle 49 alternately to each of two operating positions on main valve 24, alternately vents recess 62 (and therefore cylinder chamber 60) by way of bore 65, recess 68 in pilot valve 67 and port 66 and pressurizes recess 62 by exposing bore 65 to the high pressure fluid in chamber 22 (as shown in Fig. 2) as pilot valve 67 is alternately moved to its said two operating positions.

In a similar manner, cylinder chamber 70 is alternately subjected to the fluid pressure of chamber 22 and venting to atmosphere as pilot valve 67 is moved alternately to its two operating positions.

Chamber 70 at all times in communication with an arcuate recess 72 (Fig. 5) in main valve 24 by way of drilled ports 73 (Fig. 2), annular chamber 74, and passageway 71 (partially shown in Fig. 3 which also shows the plane in which it lies) which is identical in form to passageway 61 but diametrically opposite to passageway 61 relative to the axis of vent passageway 19. A bore 75 (Fig. 5) extends from recess 72 the abovesaid opposite side of main valve 24. A second bore 76 extends from the central recess 25 to said opposite side of valve 24 at a point adjacent to bore 75. Pilot valve 67 alternately vents and pressurizes recess 72 (and therefore chamber 70) by connecting recess 72 to vent recess 25 by way of bore 75, recess 78 and bore 76, and by exposing bore 75 to the high pressure fluid in chamber 22.

It is apparent that chamber 60 is vented when chamber 70 is pressurized and pressurized when chamber 70 is vented. A key 80, received in slots 81 and 82 of valves 24 and 67, prevents relative transverse movement between the valves.

As mentioned above, the pilot valve 67 (Fig. 2) and the main valve 24 are moved by shuttle 49. Shuttle 49 is provided with a pair of annular shoulders 85, 86 and 87, 88 at each end thereof, which shoulders provide a lost motion connection with respect to main valve 24 but not to pilot valve 67, whereby relative movement of pilot valve 67 and main valve 24 is obtained initially during each stroke, followed by simultaneous nonrelative movement of the valves thereafter. Shuttle 49 is rigidly secured to shaft 44 in the manner described above. Said shaft 44 is in turn connected to a conventional rocker arm 89 through a lost motion linkage 90 in a manner well known in the art. The rocker arm 89 is centrally supported on a pivot pin 91 extending transversely through a narrow portion of the casing 2 disposed under the valve casing 21. The rocker arm 89 comprises a pair of spaced metal strips 92, held by a bolt 93 against opposite sides of a spacer block 94.

The inner end of rocker arm 89 is suitably connected to engage an annular collar 95, slideably carried by the motor shaft 9, so that vertical movements of collar 95 are transmitted through the rocker arm 89, and the lost motion linkage 90 to the valve actuating shaft 44. The collar 95 is provided with an internal shoulder 100 in the lower portion thereof. The shoulder 100 cooperates with a shoulder 101 on the shaft 9 to provide a lost motion connection between the shaft and the collar. The air motor shaft 9 is suitably connected to a fluid pump shaft 102. The upper end of the pump shaft 102 provides a shoulder 103 which cooperates with the lower edge 104 of the collar 95 to provide another lost motion connection between the shaft 9 and the collar. When the shaft 9 moves downwardly from its uppermost position shown in Fig. 1, the collar 95 remains stationary until the shaft shoulder 101 engages the collar shoulder 100 to move the collar downwardly. When the shaft 9 subsequently moves upwardly from its lowermost position, the collar 95 will remain stationary until the shoulder 103 engages the lower edge 104 to move the collar 95 upwardly. The purpose of the lost motion linkage 90 and the lost motion connection between the shaft 9 and the collar 95 is to cause movement of shaft 44 (and therefore valves 67 and 24) only as the main piston 8 approaches a predetermined position near the end of its stroke. It is apparent that movement of shaft 44 by rocker arm 89 will be in a direction opposite to that in which the main shaft 9 moves.

Attention is now directed more particularly to Figs. 6–8 for a description of the operation of the valve arrangement. Fig. 6 schematically illustrates the valves 24 and 67 (separately for simplicity of description) together with appropriate passageways and elements as are necessary for a description of the valve operation. Corresponding elements and passageways have been assigned the same reference numerals for clarity of description; in two instances, two numbers—62 and 72 and 66 and 76—indicate the same recess and passageway in Fig. 6, whereas the mechanical structure requires separate recesses and passageways, as shown in Fig. 5. Fig. 7 shows the atmospheric, or alternatively the fluid pressure, condition of the chambers 56, 57, 60 and 70, as well as the effective resultant pressure on pistons 52 and 53 in positions I and II of valves 24 and 67.

Assuming the operating elements of the fluid motor to be in the positions shown in Fig 2, with the main piston 8 in its lowermost position and ready to initiate its upper movement, valves 24 and 67 are both in their respective I positions (solid lines of Fig. 6). Passageway 12, and, therefore, the upper portion of cylinder 4, are vented to atmosphere, while passageway 13, and, therefore, the lower portion of cylinder 4, are exposed to the high pressure fluid in chamber 22 (Fig. 2). Piston 8 moves upwardly and at a predetermined point before the end of the stroke, shaft 44 is moved downwardly by rocker arm 89, after the lost motion connection 90 has become effective. During this interval chambers 70 and 56 have been vented to atmosphere (Fig. 6) while chambers 57 and 60 are exposed to the high pressure fluid. As mentioned above, the inner spacers 46 and 47 are slightly greater outside diameter than spacers 45 and 48 (Fig. 2); therefore, the effective area of the outer surfaces of pistons 52 and 53 are greater than their corresponding inner surfaces. Consequently, the loss of power by the pump due to a valve actuating means is almost negligible inasmuch as the forces on the pistons are balanced, except for said slight difference in effective piston areas.

As soon as shuttle 49 (Fig. 2) shifts pilot valve 67 to position II (broken lines, Fig. 6) chamber 70 begins to build up to the high pressure fluid level while chamber 60 is vented. The total pressure acting on pistons 52 and 53, to aid in moving shaft 44 downwardly to shift the main valve 24, is best illustrated by the broken line in Fig. 8, which assumes, for purposes of illustration, a straight line change in pressure. As shaft 44 and shuttle 49 continue their downward motion the main valve 24 is shifted to position II (broken lines, Fig. 6) with a snap-action, whereupon chamber 56 is exposed to the high pressure fluid and chamber 57 is vented to atmosphere, all before pistons 8, 52 and 53 reach the end of their strokes. Fluid under pressure acts to cushion piston 8 as it strikes the upper cylinder head 7 (Fig. 2). In the valve actuating mechanism, two conditions are noted: the force on pistons 52 and 53 is relieved since the shifting of valve 24 initiated the balancing of the forces on either side of each piston; and the exposure of chamber 56 to high pressure fluid acts as a cushioning means for piston 52, and for piston 53, which is connected thereto. Consequently, the shock with which pistons 52 and 53 strike their cylinder heads at the end of the stroke is effectively reduced.

The motor I is now prepared to initiate the reverse stroke, valves 24 and 67 being in their II positions. In a manner similar to that described in a preceding paragraph, piston 8 moves downwardly. As soon as the lost motion connection 90 is effective, shaft 44 will start to move upwardly, shifting pilot valve 67 back to position I, which causes chamber 70 to be vented to atmosphere and chamber 60 exposed to the high pressure fluid. This results in the high pressure fluid acting on pistons 52 and 53 to move shaft 44 upwardly with a snap-action. Shuttle 49 soon thereafter shifts valve 24 to position I to cause the forces on either side of each piston, 52 and 53, to be substantially balanced. As previously mentioned, the shaft is moved more rapidly by the mechanical linkage than is possible by the fluid pressures on pistons 52 and 53 at higher motor speeds.

Inasmuch as pistons 52 and 53 will strike their respective cylinder heads at the end of each stroke with force sufficient in many cases to cause the pistons to bounce away from the cylinder heads, means have been provided for minimizing the extent of said bounce and to restore the pistons back into engagement with the cylinder heads. The restoring feature is accomplished by providing (as mentioned above) inner spacers 46 and 47 of slightly greater outer diameter than the outer spacers 45 and 48, whereby the outer surfaces of pistons 52 and 53 have a slightly greater effective area than their corresponding inner surfaces. Consequently, at the end of each stroke, a net effective force urging the pistons toward the proper cylinder head is obtained in the amount of a difference in effective area on each side of one piston multiplied by the pressure of the fluid in chamber 22 above atmospheric pressure. This feature assures accurate positioning of valves 24 and 67 at the end of each stroke, even though the pistons strike the cylinder heads with considerable force under certain conditions.

While there has been described what is believed to be the preferred embodiment of the invention, it is apparent that various changes and modifications therein may be made; and it is contemplated to cover in the appended claims all such modifications and changes as fall within the true scope and spirit of the invention.

What is claimed is:

1. A reciprocating fluid motor having a main piston, means defining a cylinder for receiving said piston, a main valve having two operating positions for admitting fluid under high pressure alternately to each end of the cylinder while exhausting the other end to cause reciprocating movement of the piston, an elongated actuator operatively connected to said piston for mechanically shifting said valve alternately to each of its operating positions and having means to prevent stalling of the motor in a position of the valve in which both sides of the piston are subjected to the same fluid pressure, wherein said last-mentioned means includes means controlled by the piston as it approaches the end of each stroke for causing a substantial longitudinal force to be applied to the actuator in aiding relation to the instantaneous piston force to positively shift the main valve from one operating position to the other, means maintaining the longitudinal forces on the actuator substantially balanced so as to exert substantially no resistance to the movement of the piston from the beginning of each stroke until the force is applied in aiding relation to the piston force, and means effective upon the valve being shifted to said other operating position to return the longitudinal forces on said actuator to a substantially balanced condition.

2. A reciprocating fluid motor having a main piston, means defining a cylinder for receiving said piston, a main valve having two operating positions for admitting fluid under high pressure alternately to each end of the cylinder while exhausting the other end to cause reciprocating movement of the piston, an actuator controlled by said piston for mechanically shifting said valve alternately to each of its said positions and having means to prevent stalling of the motor in a position of the valve in which equal fluid forces are applied to each side of the piston, wherein said last-mentioned means comprises auxiliary piston means secured to said actuator, auxiliary cylinder means receiving said auxiliary piston means, balancing means including a pilot valve providing substantially equal fluid forces on either side of the auxiliary piston means during the greater portion of each stroke of the main piston, mechanical means including said actuator controlled by the main piston as it approaches the end of each stroke for shifting said pilot valve, means effective upon the shifting of said pilot valve for applying a substantial fluid force to said auxiliary piston means in aiding relation to the force exerted by the main piston to cause said actuator to positively shift the main valve from one of its operative positions to the other, said balancing means effective upon said shifting of the main valve to cause substantially equal fluid forces to be applied to either side of said auxiliary piston means.

3. A reciprocating fluid motor having a main piston, means defining a cylinder for receiving said piston, means including a main valve having two operating positions for admitting fluid under high pressure alternately to each end of the cylinder while exhausting the other end of the cylinder to cause reciprocating movement of the piston and means for shifting said valve to both operating positions thereof, said last-mentioned means comprising a shaft, a pair of auxiliary pistons secured in spaced relation on said shaft, means defining cylinders to receive each of said auxiliary pistons, a pilot valve, mechanical means including said shaft operated by the main piston as it approaches the end of each stroke for shifting the pilot valve, means including said valves effective upon said shifting of the pilot valve for applying high pressure fluid forces to both auxiliary pistons in aiding relation to the force exerted by the main piston to shift the main valve, and means including said valves effective upon said shifting of the main valves for producing substantially balanced fluid forces on said auxiliary pistons, whereby power used by the main piston to operate said mechanical means is minimized.

4. A reciprocating fluid motor having a main piston, means defining a cylinder for receiving said piston, means including a main valve having two operating positions for admitting fluid under high pressure alternately to each end of the cylinder while exhausting the other end of the cylinder to cause reciprocating movement of the piston and having means for shifting said valve to each operating position thereof, said last-mentioned means comprising a shaft; a pair of auxiliary pistons secured in spaced relation on said shaft; means defining auxiliary cylinders to receive said auxiliary pistons; a pilot valve; means including said valves providing, during the greater portion of each stroke of the main piston, atmospheric pressure alternately on both sides of each auxiliary piston while providing fluid under high pressure on both sides of the other auxiliary piston; mechanical means including said shaft operated by the main piston as it approaches the end of each stroke for shifting the pilot valve; means, including said valves, effective upon said shifting of the pilot valve for admitting fluid under high pressure to a certain side of the auxiliary piston having atmospheric pressure thereon and for venting a certain side of the auxiliary piston having high pressure thereon to provide fluid forces on the auxiliary pistons both in aiding relation to the forces exerted on said mechanical means by said main piston, thereby to positively shift the main valve with a snap-action; and means, including said valves, effective upon said shifting of the main valve for admitting fluid under high pressure to the piston side opposite said first-mentioned certain side and for venting the piston side opposite said second-mentioned certain side, thereby to provide substantially balanced fluid forces on said auxiliary pistons.

5. The combination claimed in claim 4 together with means providing a slightly smaller effective surface area on the adjacent inner surfaces of the auxiliary pistons than on the outer surfaces to provide a bias for retaining the actuator in its end positions at the end of each stroke of the main piston.

6. A reciprocating fluid motor having a main piston, means defining a cylinder for receiving said piston, means including a main valve having two operating positions for admitting fluid under high pressure alternately to each end of the cylinder while exhausting the other end of the cylinder to cause reciprocating movement of the piston and means for shifting said valve to both operating positions thereof, said last-mentioned means comprising an elongated valve actuator having a lost motion connection with said piston and having a lost motion connection with said main valve, a pilot valve seated on said main valve and operatively engaged by said actuator, auxiliary piston means on said actuator, auxiliary cylinder means receiving said auxiliary piston means, means including said main valve defining passageways communicating with said pilot valve and said auxiliary cylinder means, means including said pilot valve and said passageways providing substantially equal fluid forces on either side of the auxiliary piston means during the greater portion of each stroke of the main piston, said actuator effective as the main piston approaches the end of each stroke for shifting said pilot valve relative to said main valve, means including said pilot valve and said passageways effective upon the shifting of the pilot valve for applying a substantial fluid force to said auxiliary piston means in aiding relation to the force exerted on the actuator by the main piston to cause said actuator to positively shift the main valve from one of its operative positions to the other, and means including said pilot valve and said passageways effective upon the shifting of the main valve to cause substantially equal fluid forces to be applied to either side of said auxiliary piston means.

7. A reciprocating fluid motor having a main piston, means defining a cylinder for receiving said piston, a main valve having two operating positions for admitting fluid under high pressure alternately to each end of the cylinder while exhausting the other end to cause reciprocating movement of the piston, an actuator operatively connected to said piston for mechanically shifting said valve alternately to each of its operating positions and having means to prevent stalling of the motor in a position of the valve in which both sides of the piston are subjected to the same fluid pressure, wherein said last-mentioned means comprises: an auxiliary piston integral with the actuator, a cylinder receiving the piston, a pilot valve and fluid passageways for applying substantially balanced fluid pressures to the auxiliary piston to maintain the actuator substantially balanced longitudinally during the greater portion of each stroke, mechanism controlled by the actuator as the main piston approaches the end of each stroke for shifting the pilot valve to cause a substantial fluid force to be applied to the actuator in aiding relation to the instantaneous actuator force to positively shift the main valve from one operating position to the other, and fluid passageways and the pilot valve rendered effective upon the main valve being shifted to the other operating position for applying substantially balanced fluid pressures to the auxiliary piston to return the actuator to a substantially balanced condition.

8. In a reciprocating fluid motor of the type having a main piston, means defining a cylinder for receiving said piston, a main valve having two operating positions for admitting fluid under high pressure alternately to each end of the cylinder while exhausting the other end to cause reciprocating movement of the piston, and an actuator operated by the piston as it approaches the end of the succeeding strokes for mechanically shifting the valve alternately to each of its operating positions, the combination with the valve and actuator of means for preventing stalling of the motor in a position of the valve in which both sides of the piston are subjected to the same fluid pressure, said last-mentioned means comprising an auxiliary piston integral with the actuator, a cylinder receiving the piston, a pilot valve and fluid passageways for applying the high pressure fluid to both sides of the auxiliary piston to maintain the actuator substantially balanced longitudinally as the main piston moves in one direction, the actuator engaging the pilot valve as the main piston approaches the end of its stroke in said one direction to shift the pilot valve to exhaust the high pressure fluid on a certain side of the auxiliary piston to cause a fluid force to be applied to the actuator in aiding relation to the main piston force to positively shift the main valve from one operating position to the other, fluid passageways and the pilot valve rendered effective upon the main valve being shifted to the other operating position for applying atmospheric pressure to the other side of the auxiliary piston to return the actuator to a substantially balanced condition, the actuator engaging the pilot valve as the main piston approaches the end of its stroke in the opposite direction for shifting the pilot valve to cause the high pressure fluid to be applied to said certain side of the auxiliary piston to cause a substantial force to be applied to the actuator in aiding relation to the main piston force to positively shift the main valve from the other operating position to the one operating position, and fluid passageways and the pilot valve rendered effective upon the main valve being shifted to the one position for applying high pressure fluid to the other side of the auxiliary piston to return the actuator to a substantially balanced condition.

9. In a reciprocating fluid motor of the type having a main piston, means defining a cylinder for receiving said piston, a main valve having a first and second operating position for admitting fluid under high pressure alternately to each end of the cylinder while exhausting the other end to cause reciprocating movement of the piston, and an actuator operated by the piston as it approaches the end of succeeding strokes for mechanically shifting the valve alternately to each of its operating positions, the combination with the valve and actuator of means for preventing stalling of the motor in a position of the valve in which both sides of the piston are subjected to the same fluid pressure, said last-mentioned means comprising an auxiliary piston integral with the actuator, means defining a cylinder receiving the auxiliary piston, a pilot valve reciprocably carried by the main valve, passageway means continuously connecting the chamber defined by one end of the main piston and its cylinder with the chamber defined by one end of the auxiliary piston and its cylinder, a chamber defined by the main valve, passageway means continuously connecting the main valve chamber with the chamber defined by the other end of the auxiliary piston and its cylinder, passageway means in the valves for applying atmospheric pressure to the main valve chamber in a first position of the auxiliary valve and for applying the high pressure fluid to the main valve chamber in a second operating position of the pilot valve, the actuator including lost-motion surfaces sequentially engaging the auxiliary valve then the main valve during movement in each direction to shift the valves to each of their corresponding positions, the valves, chamber, and passageways effective to cause atmospheric pressure to be applied to both sides of the auxiliary piston, when both valves are in their first positions, to cause the application of high pressure fluid to other end of the auxiliary piston to produce a force in aiding relation to the main piston force on the actuator incident to shifting of the pilot valve to its second position, to cause the application of high pressure fluid to the one end of the auxiliary piston incident to the subsequent shifting of the main valve to its second position, to cause atmospheric pressure to be applied to said other end of the auxiliary piston incident to the shifting of the auxiliary valve back to its first position to produce a force on the actuator in aiding relation to the main piston force, and to cause atmospheric pressure to be applied to the one end of the auxiliary piston incident to the subsequent shifting of the main valve back to its first position.

References Cited in the file of this patent
UNITED STATES PATENTS

| | | |
|---|---|---|
| 347,173 | Goyne | Aug. 10, 1886 |
| 424,686 | Patten | Apr. 1, 1890 |
| 511,836 | Dahlstrom | Jan. 2, 1894 |
| 2,688,314 | Holm et al. | Sept. 7, 1954 |

FOREIGN PATENTS

| | | |
|---|---|---|
| 640,642 | Great Britain | July 26, 1950 |